Sept. 22, 1970 C. H. DAGNALL, JR., ETAL 3,530,255

EQUIPMENT FOR LATCHING INTEROFFICE TRUNKING AND SWITCHED PATHS

Filed Aug. 17, 1967 3 Sheets-Sheet 1

INVENTORS C. H. DAGNALL JR.
G. C. IRWIN
J. B. KENNEDY

BY Frederick W. Padden
ATTORNEY

Sept. 22, 1970 C. H. DAGNALL, JR., ETAL 3,530,255

EQUIPMENT FOR LATCHING INTEROFFICE TRUNKING AND SWITCHED PATHS

Filed Aug. 17, 1967 3 Sheets-Sheet 2

EQUIPMENT FOR LATCHING INTEROFFICE TRUNKING AND SWITCHED PATHS

Filed Aug. 17, 1967

3 Sheets-Sheet 3

3,530,255

EQUIPMENT FOR LATCHING INTEROFFICE TRUNKING AND SWITCHED PATHS

Clarence H. Dagnall, Jr., Westerville, Gordon C. Irwin, Columbus, and James B. Kennedy, Bexley, Ohio, assignors to Bell Telephone Laboratories, Incorporated, Murray Hill and Berkeley Heights, N.J., a corporation of New York Filed Aug. 17, 1967, Ser. No. 661,326
Int. Cl. H04m 7/00
U.S. Cl. 179—18 17 Claims

ABSTRACT OF THE DISCLOSURE

A system is disclosed for augmenting, or supplementing, direct communication trunks between two central offices by controlling the establishment and latching of switched connections through an intermediate office to provide direct paths therebetween. A switch network and common switching equipment are provided at the intermediate office for the establishment of "tandem" connections between the central offices. The intermediate office further includes latching control equipment which is responsive to coded signals generated locally or from a remote location for connecting to prescribed "tandem" connections and thereafter controlling the latching of such connections.

BACKGROUND OF THE INVENTION

This invention relates to communication systems and particularly to equipment used in telephone systems for latching, or locking, interoffice trunking connections through an intermediate office and thereafter utilizing such connections for extending successive calls toward a terminating office.

The volume of call traffic between two offices is often sufficiently large to justify the use of direct interoffice trunks. These trunks reduce the number of circuit operations needed to complete calls and have therefore proven satisfactory for quickly serving the bulk of the call traffic between two offices.

Occasionally, the volume of calls requesting service during peak or heavy traffic periods exceeds the capacity of the direct trunks and the excess traffic which is not switched over such trunks customarily is connected over alternate routes through intermediate tandem switching offices. Such alternate routing is often burdensome or disadvantageous because it requires numerous common control circuit operations at intermediate switching offices during call processing. Consequently, the time required to establish call connections is increased. In addition, calls switched over alternate routes are sometimes partially completed to an intermediate office only to find that all routes therefrom to the desired called station are busy.

SUMMARY OF THE INVENTION

In accordance with the principles of this invention, equipment is provided for furnishing latched, locked-in, switched connections between two local central offices via a tandem, or intermediate, office. The equipment is advantageously located in the tandem office and is activatable prior to an anticipated peak call traffic period for furnishing such latched connections to augment trunks directly interconnecting the central offices. These latched connections are, advantageously, maintained between local central offices for the duration of the peak call period for serving successive calls and thereby eliminate the need for repeatedly establishing and releasing individual connections through the tandem office for each call.

Initially, tandem connections are established between the two offices through an intermediate office utilizing existing trunks and associated circuitry. The establishment of these connections is controlled in a conventional manner from a traffic management center interconnected with one of the central offices. The present invention departs from the prior art in that facilities are provided at the intermediate office for controlling the latching, or locking, of the aforementioned tandem connections in response to the receipt of coded signals from either a local tandem office circuit or the traffic management center. Latching is accomplished by a latching control circuit which provides a distinct holding circuit for maintaining each of the trunk interconnections exclusive of existing supervisory holding circuits. Following the latching of a tandem connection, circuitry at the call originating office is activated to route excess call traffic generated during the peak traffic period over the latched tandem, or augmentation, connections.

This invention by providing for latched augmentation connections affords a solution to the aforementioned alternate routing problems and reduces the time required to extend calls through a tandem office. Each of the latched augmentation connections is the functional equivalent of a direct interoffice trunk and, advantageously, calls routed thereover are completed more quickly inasmuch as communication control and switching network operations are not required in the intermediate office during the establishment of such calls.

BRIEF DESCRIPTION OF THE DRAWING

The foregoing and other structural aspects and advantages of this invention will be more clearly understood from a reading of the following description of an illustrative embodiment with reference to the drawing in which.

Figures 1, 4:
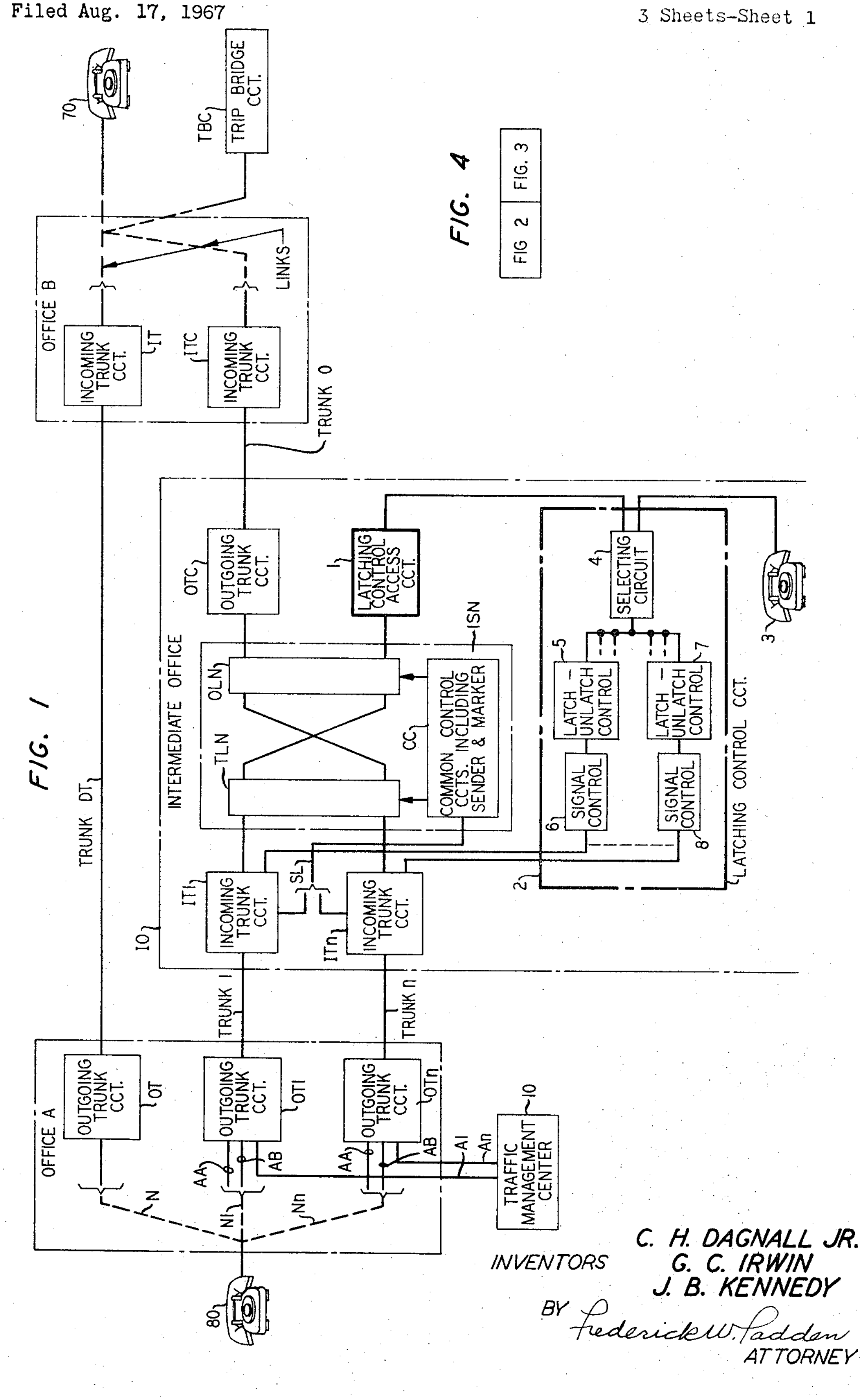
FIG. 1 shows a block diagram depicting one specific illustrative embodiment of an augmentation system in an intermediate office IO serving two local central offices A and B.
FIG. 4 sets forth the manner of interconnecting FIGS. 2 and 3 to illustrate connection paths between office A and the intermediate office for the remote control of a latching control circuit and for routing of call traffic.

As shown in the drawing, the latching facilities at the intermediate office IO include a latching control circuit, latching control access circuit and associated equipment all of which may be advantageously incorporated in an automatic telephone system wherein common control circuits are provided to control the establishment of calls through a switching network. One such system is disclosed in R. N. Breed et al. Pat. 2,848,543, issued Aug. 19, 1958. Moreover, the outgoing trunk circuits OT and OT1–OT$n$ of office A together with the circuitry of the traffic management center may be integrated into an automatic telephone system of the design disclosed in A. J. Busch Pat. 2,585,904 of Feb. 19, 1952. The invention described herein is illustratively embodied in both a tandem and a local office telephone system of the type disclosed in the respective Breed et al. and Busch patents. The drawing discloses only those details of the circuit equipment of exemplary embodiment as are necessary for a complete understanding of this invention. Certain of the other equipment units of the Breed et al. and Busch patents are neither shown nor described in detail herein except where necessary for a complete understanding of the invention. Reference may therefore be made to the Breed et al. and Busch patents for a more complete understanding of the construction and operation of such other equipment.

GENERAL DESCRIPTION

The interrelations and functions of the equipment of the exemplary embodiment will now be described with reference to FIG. 1 which sets forth the essential switching units in each of three switching offices used to illustrate the establishment of both direct call connections between office A and office B as well as tandem call connections therebetween via intermediate office IO. A tandem connection is established, illustratively, using outgoing trunk circuit OT1, interoffice trunk 1, and incoming trunk circuit IT1, switched links of the office switching network ISN, outgoing trunk circuit OTC, interoffice trunk O and incoming trunk circuit ITC. Such a connection is established to serve individual calls on an alternate routing basis or, advantageously, in accordance with this invention, for establishing latched connections to serve many calls. Alternatively, direct connections are established between offices A and B, for example, by utilizing the trunk circuits OT and IT and the direct interoffice trunk DT to complete routine interoffice calls.

To establish a background for the operation of the exemplary embodiment of this invention, call connections over a direct trunk and via office IO are now briefly described. Assume that a call request is originated to office B from an originating station, for example station 80, and then the address code of a station in office B such as station 70 is dialed from station 80 into the office A system. As disclosed in the aforementioned Busch patent, if direct trunk DT, interconnecting offices A and B, is idle and available to complete a call connection to office B, this path is preferred for establishing the call connection. Accordingly, a connection is established between an outgoing trunk circuit OT and station 80 via a network path N of office A illustrated in a dashed line in FIG. 1. A portion of the received digits of the address code are thereafter transmitted in a well known manner through circuit OT via direct trunk DT to incoming trunk circuit IT of office B. This transmission causes office B to complete a connection from circuit IT via the switched links of office B to station 70.

When all of the direct trunks between offices A and B are busy, calls are switched via an alternate route through office IO. Under these circumstances, the first three digits of the code dialed by station 80 cause the equipment (not shown) of office A to interconnect station 80 with an idle one of the outgoing trunk circuits OT1–OT*n* via respective network paths N1–N*n* of office A. Assuming circuit OT1 is available for such connection, it seizes trunk circuit IT1 in a conventional manner via trunk 1. Subsequently, a sender of the common control CC in office IO is attached over a sender link SL to circuit IT1. Thereafter, office A transmits the dialed called address code to the sender for initiating the completion of a call connection via trunk and office link networks TLN and OLN, respectively, and outgoing trunk circuit OTC to office B under control of common control CC. Upon the completion of this connection, office IO forwards a portion of the received address code for causing office B to complete the establishment of a connection to station 70.

In accordance with the specific embodiment of this invention as illustrated herein, a tandem call connection is established in a manner similar to that just described between station 80 and station 70 for latching at office IO. This connection differs from the previously described connection in that it originates at center 10, terminates in office B at trip bridge circuit TBC and does not require switching operations at office A for connecting to circuits OT1–OT*n*. Center 10 is simply attached via access paths A1–A*n* and circuits OT1–OT*n* to trunk 1–*n*. Thereafter seizure and coded signals are sent from center 10 to seize circuits IT1–IT*n* for directing the establishment of a connection via office IO and office B to circuit TBC. This circuit provides a tripping bridge to trip ringing in a well known manner which is provided by the incoming trunk ITC.

Turning our attention now to the latching control circuit 2 shown in office IO and in heavy lined block of FIG. 1, it is controllable advantageously either locally from station 3 or remotely from management center 10 to latch or unlatch tandem call connections established as previously explained from the center 10 via offices IO and B to circuit TBC. Under remote control, latching circuit 2 is connected to center 10 via latching control access circuit 1, switching circuit network ISN, trunk circuit IT1–IT*n*, trunks 1–*n*, trunk circuit OT1–OT*n* and access paths A1–A*n*. After such a connection is established, a sender of circuit CC sends directing digit signals via the connection to selecting circuit 4. These signals direct the latching control circuit 2 to a designated one of the incoming trunk circuits IT1–IT*n* for latching control over a call connection previously established from that trunk circuit to circuit TBC.

To elaborate, prior to the establishment of a tandem connection to be latched, a craftsman at center 10 determines the idle-busy status of an outgoing one of the trunk circuits OT1–OT*n* via the access conductors A1–A*n*. Assuming circuit OT1 is idle, center 10 seizes that circuit and the seizure signal is transmitted forward to trunk circuit IT1 for causing it to be connected to a sender of common control CC over sender link SL. After a suitable delay, the craftsman transmits the digits of a prescribed address code for circuit TBC to the sender for instructing common control CC to establish a switched link connection via network ISN to outgoing trunk circuit OTC. Thereafter, the sender transmits digits identifying the called destination to office B for complete of the connection in a manner similar to that described previously for a tandem connection and then releases from the connection.

Center 10 is next used to establish a connection to latching control circuit 2 in office IO for controlling the latching of the previously described connection between center 10 and circuit TBC. The latter connection is placed on temporary hold and a control connection is initiated via access conductors A1–A*n* via an idle one of the circuits OT1–OT*n*. Assuming, for illustrative purposes, that circuit OT*n* is idle, a seizure signal is forwarded thereover to circuit IT*n* via interoffice trunk *n* for controlling the connection thereto of a sender of common control CC. After an appropriate delay, seven digits are transmitted from center 10 over the connection into the sender. The first three digits, as explained in Breed et al., direct the control circuit CC to establish a connection via network ISN between terminations in the trunk and office links frames for establishing a connection between circuit IT*n* and latching control access circuit 1. The remaining four digits are now pulsed by the connected sender through circuit 1 to selecting circuit 4 of latching control circuit 2.

As previously explained, control circuit 2 is controllable to latch or unlatch a particular incoming trunk circuit. The latching operation is set in motion in response to a predetermined group of four digits received at selecting circuit 4. Each one of circuits IT1–IT*n* has associated therewith two distinctive groups of four digit numbers which identify the trunk circuit and, in addition, indicates respectively either the "latching" or "unlatching" of the identified trunk circuit. Assuming in the present example that the last four digits identify the circuit IT1 as well as a "latch" function, the selecting circuit 4 activates latch-unlatch control 5 and signal control 6. A magnetic latching relay operates in the latter circuitry to ground a lead to incoming trunk circuit IT1 and thereby to provide an exclusive holding circuit for the closed links in network ISN connected to the latched trunk circuit.

Similarly, different groups of numbers received at circuit 4 control the release of a latching relay in signal control 6 for removing the holding ground priorly extended to one of the circuits IT1–IT*n* for unlatching closed links in office IO.

Referring now to circuits OT1–OT*n*, each is connected to the switching network (not shown) of office A via two appearances, AA and AB. Appearance AB is utilized exclusively to gain access to such circuits for extending call connections in office IO. The appearance AA is utilized for normal call connections which require the operation of common control CC at office IO for extending a connection to a particular called line terminal. Manifestly, both appearances are not available to complete call connections at the same time. Accordingly, circuits OT1–OT*n* are provided with idle-busy appearance control circuitry which is controllable to furnish a busy indication on either appearance. In this manner the common control circuit (not shown) of office A is controlled to extend suitable call connections directly to office B over the latched connection, advantageously, to provide a direct trunk or to supplement existing direct trunks.

A magnetic latching relay is provided in each of the circuits OT1–OT*n*. It is operated by center 10 via respective paths A1–A*n* for providing a busy indication on appearance AA or, alternatively, released for providng a busy indication on appearance AB.

DETAILED DESCRIPTION

Figure 2:
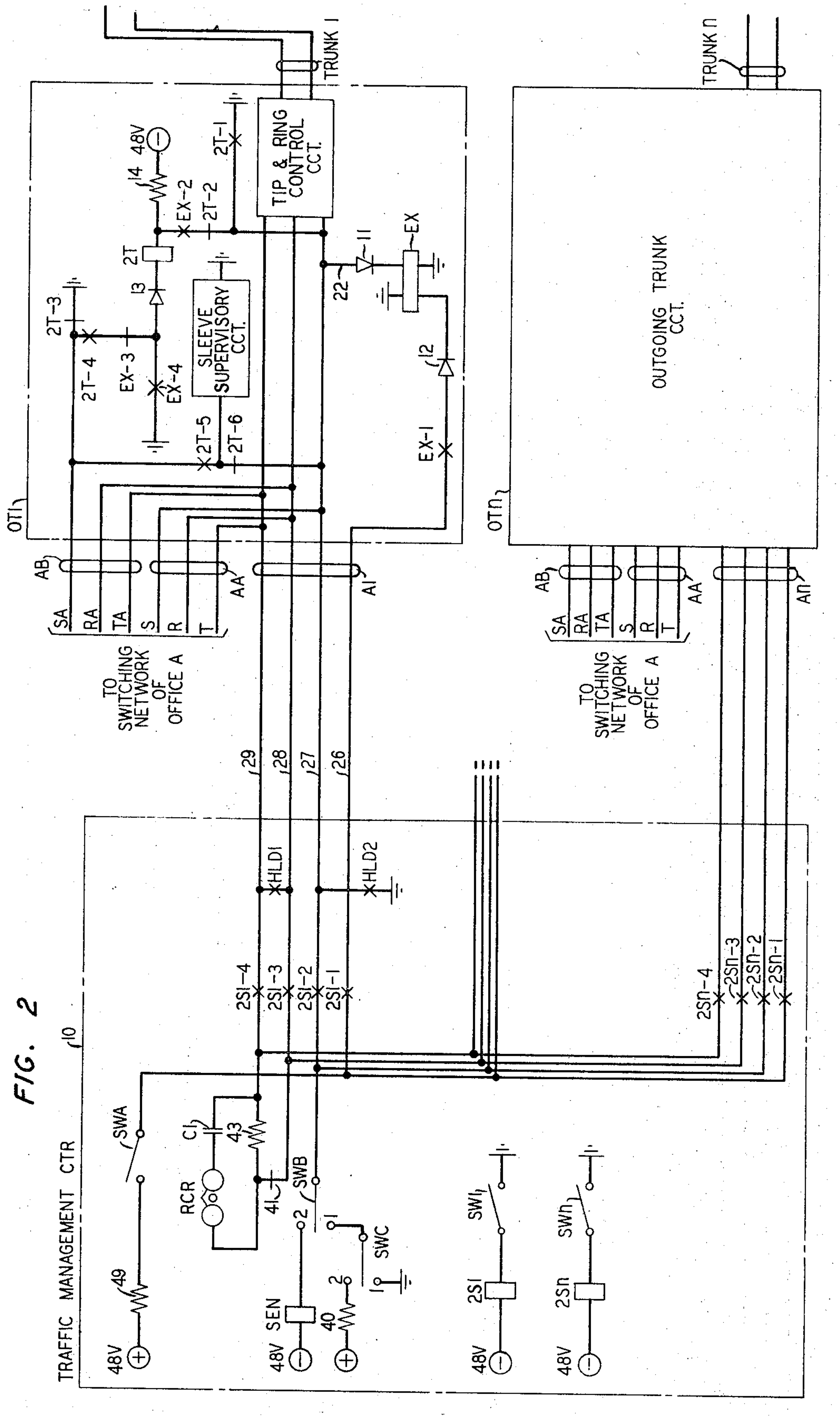
FIG. 2 sets forth an illustrative embodiment of an augmentation control circuitry utilized in an outgoing trunk circuit OT1 in the office A for controlling appearances of that circuit in the office A switching network, as well as associated connecting circuitry in a traffic management center.
Figure 3:
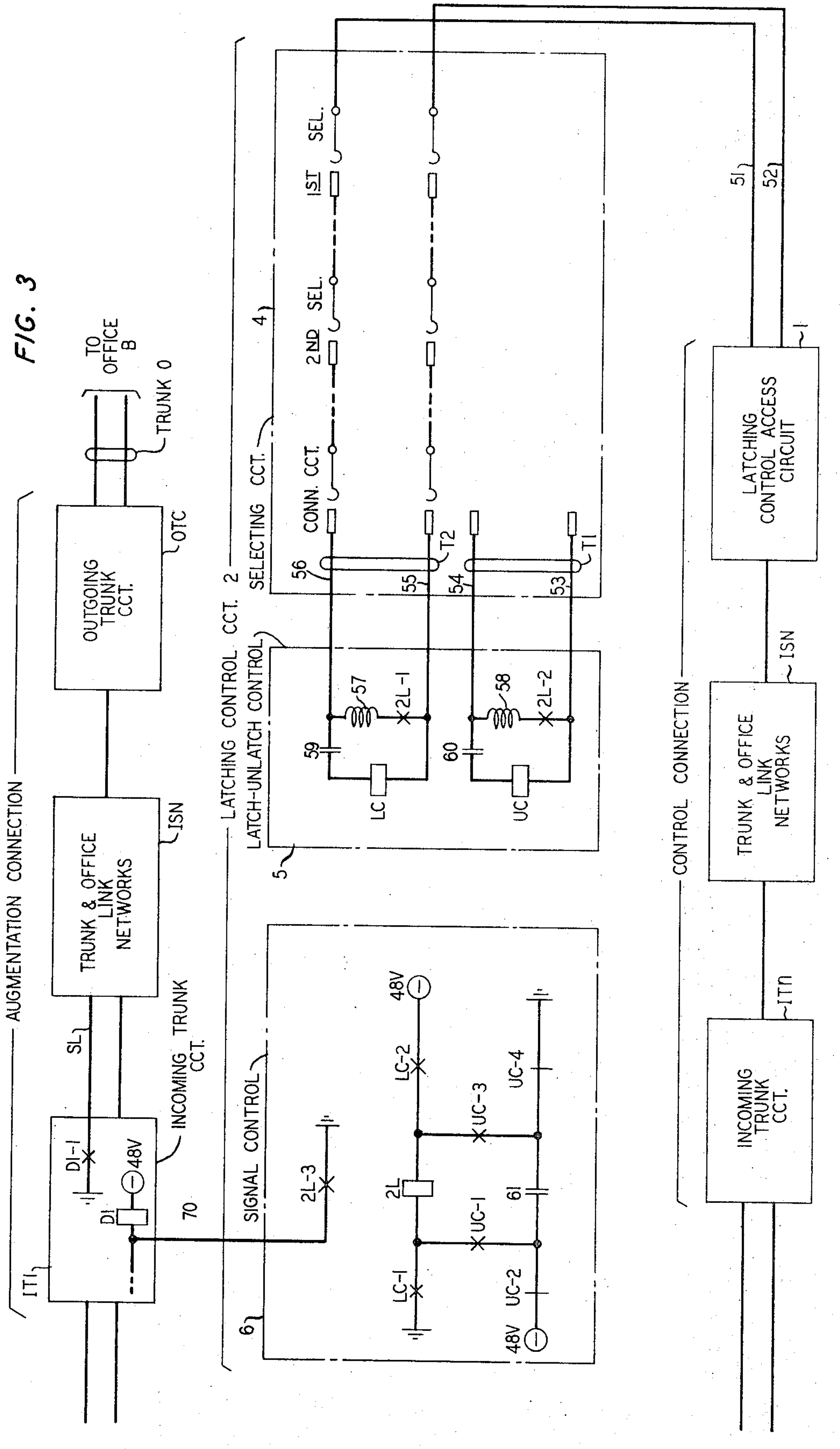
FIG. 3 depicts an illustrative embodiment of the latching control circuit including structural details of the selecting, signal control and latch-unlatch control circuitry integrated into the intermediate office.

Referring now to FIGS. 2 and 3, a detailed description will be presented of the circuit operations for establishing and maintaining an augmentation connection and unlatching such a connection under remote control of the management center 10. FIG. 3 depicts circuitry of office IO in seperate connection configurations, one of which is an "augmentation connection" and the other a "control connection." It will be recalled from the general description that a tandem connection is first established under control of center 10 between offices A and B via network ISN of office IO. Thereafter, that connection is converted to an augmentation connection by the action of the latching control circuit 2 which assumes control of the maintenance of the interconnected links of network ISN to the exclusion of supervisory apparatus in the incoming trunk circuit.

Idle-busy test

Before one of the trunk circuits OT1–OT*n* can be utilized for the establishment of an augmentation or control connection its idle-busy status is determined. A busy condition is indicated by ground on conductor S of circuits OT1–OT*n* which terminates in the switching network of office A. An idle state is indicated by no ground on a conductor S. Such a test is instituted after a relay **2S1–2S*n* is operated over the obvious paths from ground, through the respective switch contact, and winding of relays 2S1–2S*n* to battery. The operation of one of these relays 2S1–2S*n* closes its contacts for connecting the control circuitry of center 10 directly to a particular trunk circuit. To prevent a premature seizure of the tested trunk circuit, dial pulse contact 41** remains open until the busy-idle status is indicated.

A busy test is thereafter made by closing switch SWB to position 2 for connecting relay SEN via the respective operated one of the contacts 2S1–2 to **2S*n*–2** and a conductor of access leads A1–A*n* to the conductor S. If the ground is present, relay SEN is operated over the obvious path to provide an indication with equipment (not shown) that the trunk is in use. Upon the receipt of such an indication, the craftsman releases the operated one of the relays **2S1–2S*n*** by opening the respective one of switches SW1–SW*n*. This in turn releases the connection to the tested trunk circuit and the craftsman may thereafter proceed to operate a different switch for testing another circuit.

Augmentation connection

Assuming that circuit OT1 is idle, the establishment of the augmentation connection may proceed. Specifically, the closure of contacts 2S1–3 and 2S1–4 prepares a loop path for seizing circuit OT1 over respective leads 28 and 29 for energizing the tip and ring control circuit. The loop path is closed by dial pulse contact 41, held open during busy test, and resistor 43 for energizing the latter circuit to transmit a seizure signal over trunk 1 to circuit IT1 (FIG. 3). After a suitable delay to insure the connection of a sender (not shown) to circuit IT1, a craftsman at center 10 dials the address code of a circuit TBC. The dialed code is repeated by opens and closures of pulsing contact 41 into the attached sender. Common control circuit CC of office IO, as described priorly, extends a connection through network ISN to trunk OTC. A portion of the received address code is outpulsed over trunk O to office B in a customary manner. In turn, the latter office extends a connection from circuit ITC to circuit TBC.

This tandem connection between center 10 and circuit TBC is placed on "hold" to maintain the interconnected network paths in offices IO and B while a craftsman at center 10 initiates a control connection via an available one of the circuits OT2 (not shown)–OT*n*. During the establishment of the tandem connection the dialing loop including resistor 43 and contact 41 maintains a hold condition on circuit OT1. Just prior to the release of relay 2S1, two contacts labeled in FIG. 2 as HLD1 and HLD2 are closed. The former maintains a loop closure on conductors 28 and 29 in lieu of the dialing loop to hold circuit OT1 and, accordingly, the links of the tandem connection. The latter contact provides a ground on conductor 27 and on the S lead of appearance AA to prevent seizure of circuit OT1 thereover.

Control connection

A control connection links the circuitry of center 10 to the latching control circuit 2 at office IO for transmission thereover of coded signals. These signals operate circuit 2 for controlling the latching or unlatching of certain predetermined incoming trunk circuits for respectively converting tandem connections to augmentation connections, or vice versa.

A control connection is established over an available one of circuits **OT1–OT*n***. For illustration, circuit OT*n* is utilized inasmuch as circuit OT1 is being used by way of example for the tandem connecton which at this time is in the held state as explained priorly. A control connection is initiated by the operation of switch SW*n* which in turn operates relay **2S*n*** over an obvious path. Thereafter an idle-busy test is made, as explained previously, for determining the status of the trunk by connecting relay SEN to the S lead in circuit OT*n*. Assuming that circuit OT*n* is idle, it is seized and in a customary manner a seizure signal is forwarded to circuti IT*n*. After an appropriate delay, to allow for the connection of a sender to circuit IT*n*, a craftsman at center 10 forwards seven digits to the connected center. As disclosed in Breed et al. the common control circuit CC establishes a connection via network ISN between circuit IT*n* and latching control access circuit 1. In addition, as also disclosed in the abovementioned patent, the address code is translated by common control circuit CC which causes the connected sender to outpulse the last four digits of the address code to select selecting circuit 4 for controlling the latching operation.

The four digits are utilized by this inventive structure for identifying a particular incoming trunk circuit and the function to be performed thereon, i.e. latch or unlatch.

A distinctive four digit code is used herein to indicate a particular trunk circuit and the latch function. A different code is used to indicate the unlatch function on the same trunk circuit. In the present example a priorly established tandem connection via trunk circuit IT1 is being held and, accordingly, the last four digits indicate the identity of that trunk circuit and the latch function.

THE OPERATION OF THE LATCHING CONTROL CIRCUIT 2

This circuit shown in FIG. 3 consists of a selecting circuit 4, latch-unlatch control circuit 5 and signal control circuit 6. The circuit 2 is responsive to the receipt of predetermined four-digit signals in the circuit 4 for transmitting latch or unlatch signals to an incoming trunk circuit identified by the received signals. Since the structural details of each of the signal control circuits 6 and 8 and latch-unlatch control circuits 5 and 7 of FIG. 1 are identical and since the present example involves only so much of the latching circuitry as is used for transmitting latch and unlatch signals to incoming trunk circuit IT1, only the signal control 6 and latch-unlatch control 5 are set forth in detail. It will be understood from the foregoing discussion that every other incoming trunk circuit can be signalled and controlled in a like manner. For example, if it were desired to latch or unlatch the circuit IT*n* of FIG. 1, signal control 8 and latch-unlatch control 7 would be activated.

Selecting circuit 4 comprises a well known step-by-step switch train, including first and second selectors and a connector switch circuit. Circuit 4 responds to selectively generated dial pulses received over conductors 51 and 52 in a conventional manner, i.e. the first two digits direct the first and second selectors and the last two digits direct the connector circuit to a particular set of terminals, such as terminals T1 and T2. Similarly, dial pulses are selectively received by the first selector from the local tandem telephone station 3 (shown in FIG. 1) for operating the selector and connector switches in a like manner to select a particular terminal. For ease in understanding this invention only two sets of connector circuit terminals are depicted in FIG. 3 and they are associated in this illustration with incoming trunk circuit IT1. Every other "latchable" trunk circuit in office IO is similarly associated with unique sets of connector terminals.

Turning now to the description of how a tandem connection via trunk circuit IT1 is latched into an augmentation connection, it will be recalled from the prior explanation that a trunk connection is established between center 10 and the latching control access circuit 1 via a control trunk *n* connected to trunk circuit IT*n* and the dial pulses are sent over the control connection to effect the latching. These pulses are applied to selecting circuit 4 via conductors 51 and 52 to direct the first and second selectors and connector switch circuits to the terminal T2. Thereafter, the connector is responsive in a conventional manner for applying ringing to leads 55 and 56 through capacitor 59 to activate relay LC. In activating, relay LC operates relay 2L in signal control 6 over the path from ground through contact LC–1, the relay 2L winding, contact LC–2 and the negative 48-volt battery.

Operated relay 2L transmits a latching signal to incoming trunk circuit IT1 by applying ground via contact 2L–3 and conductor 70. Relay 2L also actuates its contact 2L–1 for connecting inductor 57 between conductors 55 and 56, thereby presenting a low bridging impedance toward the conventional ringing supply (not shown) of the connector circuit. This low impedance effects the tripping of ringing in a well known manner which, in turn, causes the release of relay LC. The latter then opens contacts LC–1 and LC–2 removing battery and ground from the winding of relay 2L. However, relay 2L is a magnetic latching relay and remains in the operated, or latched, condition.

Capacitor 59 is placed in series with the winding of relay LC to prevent its operation from 48-volt battery which is superimposed on the ringing supply during the "silent periods" following the tripping of ringing.

The connector circuit provides a customary audible ring-back signal while ringing is applied to the connector terminal. The ring-back signal is transmitted over the established control connection to center 10 for indicating the successful operation of the latching control circuit. Such an audible signal is detectable, for example, with a conventional telephone receiver RCR bridged across resistor 43 and connected by a capacitor C1. That signal is removed when the tripping bridge including inductor 57 is connected to conductors 55 and 56 indicating that the requested trunk circuit is latched. Thereafter, center 10 releases the control connections and disconnects from control circuit 2.

Specifically, the control connection is released when a craftsman at center 10 opens switch SW*n* for releasing relay 2S*n*. In releasing, contacts 2S*n*–3 and 2S*n*–4 disconnect the pulsing loop comprising resistor 43 and contact 41 from circuit OT*n* which in turn transmits a release signal, in a customary manner, to circuit IT*n* and circuit 1. The latter circuits as well as circuit OT*n* release and the held links in office IO also release. In addition, the aforementioned operated first and second selectors and connector circuit release upon the release of circuit 1. Magnetic latching relay 2L in signal control 6, however, remains operated for maintaining a latch signal, namely ground on conductor 70, to hold the switch links in network ISN connected to circuit IT1.

The craftsman next opens the HLD1 contact bridging conductors 28 and 29 to circuit OT1 for opening the holding circuit thereof. In a manner analogous to trunk circuit operations in systems having calling party control, the tip and ring control circuit of circuit OT1 forwards a release signal to circuit IT1 which in turn forwards a release signal to circuit OTC via the latched connections. Circuit OTC thereafter transmits a release signal to office B via trunk O for causing the release of the switched connections therein between circuits IT and TBC, such as for example described in Busch. Advantageously, and as contemplated by this invention, the switched links in network ISN between circuits IT1 and OTC are maintained operated by the latching ground on conductor 70.

The latch signal on conductor 70 is connected within circuit IT1 to a holding circuit therein normally utilized for maintaining the switched links of network ISN. Specifically, in a crossbar type switching system such as, for example, in Breed et al., this ground signal is connected within the trunk circuit to a relay D1 to maintain its operation so that contact D1–1 maintains a ground on lead SL to the hold magnets in crossbar switches (not shown) of the trunk and office link networks ISN. Still another method is to connect lead 70 directly to lead SL at the network ISN bypassing the incoming trunk circuit. In accordance with the preferred embodiment of this invention, the trunk circuit supervisory control circuitry normally utilized to maintain such switched links is rendered ineffective and such maintenance is exclusively controlled by the latch signal.

After an augmentation connection is established, a variety of circuit operations occur in the outgoing circuit OT1 to enable calls to be routed via the appearance AB of that circuit and precluded from being switched over appearance AA. Referring to FIG. 2, appearance AB is terminated in the network of office A and is identified by the common control circuit therein (not shown) as being associated with direct trunks between offices A and B. Appearance AA is likewise terminated in the office A network but is, however, identified by common control as being associated with a direct trunk between offices A and IO. This arrangement enables the equipment (not shown) of office A to functionally control, for example, the outpulsing of digits dependent on the trunk appearance used in the establishment of a call connection. Consequently, the office A equipment is automatically effected to transmit when required only the station digits of an address code over the latched connection without the necessity for outpulsing the prefixing office code digits. Accordingly, this saves outpulsing time as well as the time necessary for switching operations in office IO.

UNLATCHING AN AUGMENTATION CONNECTION

Before discussing in detail the manner in which calls from office A to office B are served over the augmentation connection via the AB appearance of circuit OT1, it is deemed convenient to explain how the last described control connection may be utilized for controlling the unlatching of the augmentation connection. When an augmentation connection is no longer required to serve the direct call traffic between offices A and B, the latching signal is removed from the incoming trunk circuit IT1 for restoring the customary calling party control over the maintenance of switched links through network ISN to the trunk supervisory control circuits.

Specifically, circuit IT1 is unlatched by establishing a control connection via trunk circuit IT*n*, as previously explained, and next dialing a unique address code to cause the connector circuit of circuit 4 to step onto the terminal T1. Thereafter, ringing voltage is applied to conductors 53 and 54 through capacitor 60 to operate relay UC. The operation of relay UC closes two contacts, UC–1 and UC–3, in signal control 6 to connect capacitor 61 across the windings of relay 2L. Prior to the operation of relay UC, capacitor 61 was charged to negative 48 volts from ground, contact UC–4, capacitor 61 and contact UC–2 to battery. When the charged capacitor is connected across the 2L relay winding, capacitor 61 discharges and effects the release of relay 2L. Relay 2L in releasing opens contact 2L–3 to remove the latching ground signal from conductor 70, and closes break contact 2L–2 to trip ringing in the connector switch circuit. As described above, this circuit action results in the removal of the audible ringing signal for indicating to center 10 that circuit IT1 is unlatched and restored to normal service. Upon receiving that indication, a craftsman at center 10 opens switch SW*n* for initiating the release of the control connection. In addition, the craftsman operates switch SW1 associated with circuit OT1 for controlling the release of relays EX and 2T to make appearance AB busy and to remove a busy indication from appearance AA.

Advantageously, the removal of the latch signal from conductor 70 does not affect a call in progress through circuit IT1. This obtains because the switched links of network ISN are maintained upon the removal of the latching signal by the trunk supervisory circuits in circuit IT1. Upon the completion of the call, the switched links are released and the circuits IT1 and OTC are automatically returned to normal service.

OUTGOING TRUNK CIRCUIT APPEARANCE CONTROL

At this point, it is advisable to depart from the discussion of the establishment of control and augmentation connections and describe how an augmentation connection is used for servicing direct call traffic between offices A and B. The description is concerned with the traffic originating in office A and, importantly, with the equipment for routing calls to office B over an augmentation connection. It will become obvious from the succeeding discussion that the circuit techniques taught herein for directing call traffic originating in office A over a latched connection can be employed in office B for directing traffic originating thereat to provide two-way call traffic over latched connection.

Turning now to FIG. 2, circuitry is shown in circuit OT1 for controlling the idle-busy indication of appearances AA and AB. Each circuit OT1–OT*n* which is arranged for the establishment of an augmentation connection is equipped with such appearances. In this presentation only the circuit structure of circuit OT1 is described; however, it is typical of other similarly equipped trunk circuits.

Appearance AA in the switching network (not shown) of office A is directly connected to circuit OT1 via conductors T, R and S and is provided for connecting two originating lines or trunks which require additional switching operations at office IO to complete a call connection. Appearance AB is available exclusively for establishing a call connection over a latched augmentation connection through office IO to office B and is interconnected to circuit OT1 via conductors TA, RA and SA. Manifestly, both appearances are not used at the same time and, accordingly, one of them is artifically made busy by circuit OT1 under control of center 10. Appearances AA and AB are made busy to call traffic originating in office A by connecting ground to conductors S and SA, respectively.

Turning now to the circuit operation within circuit OT1 for removing a busy indication from appearance AB under control of circuit 10, it is initiated upon the operation of switch SW1 which in turn operates relay 2S1. A busy condition on appearance AB is provided by a ground connected by a contact 2T–3 to conductor SA. Upon the operation of the 2T relay a busy ground on conductor SA is removed and appearance AA is made busy by connected ground to conductor S.

Specifically, center 10 is connected to circuit OT1 by conductors 26–29 and contacts 2S1–1 to 2S1–4. Prior to changing the appearance status, a craftsman operates switches SWB and SWC to position 1, respectively, for applying ground to conductor 27 via contact 2S1–2. Also, the craftsman opens the HLD2 contact to remove the busy ground applied to circuit OT1 during the establishment of the control connection. A busy ground is maintained on conductor S to prevent the seizure of circuit OT1 over appearance AA at the local switching network of office A through switches SWB and SWC. Thereafter relay EX is operated from center 10 over a path which can be traced from center 10 and includes positive 48 volts, resistor 40, switch SWC momentarily closed to position 2, switch SWB, contact 2S1–2, conductor 27, diode 11 and the winding of relay EX to ground. In operating, the magnetic latching relay EX latches for remaining operated after the above-mentioned operating path is opened and until an oppositely directed magnetic field is generated in its windings. After a short delay to insure the operation of relay EX, the craftsman restores switch SWC to position 1 for maintaining a busy ground on conductor S. Diode 11 in the above-mentioned path is used to isolate the winding of relay EX from negative voltage transients which are at times impressed on conductor S by the office A switching equipment.

Relay EX in operating prepares a path to operate relay 2T. This path includes contact EX–4 which, upon the operation of relay EX, closes ground to the winding of relay 2T via diode 13. However, relay 2T is unable to operate at this time because the negative 48 volts connected to the opposite winding terminal of relay 2T via resistor 14 is shunted-down by a ground on conductor 27 connected thereto via a path including contact EX–2 and contact 2T–2.

The foregoing circuit operations within circuit OT1 prepare it to assume independent control of a busy indication on appearance AA upon the release of center 10 from the circuit OT1. Relay 2T is operated for removing the busy indication from appearance AB and for making appearance AA busy when relay 2S1 is released by opening switch SW1. Specifically, contact 2S1–2 is opened to remove the above-described shunt-down ground from the above-mentioned opposite winding terminal of relay 2T. With the ground removed, relay 2T operates over a path from ground which includes contact EX–4, diode 13, the windings of relay 2T and resistor 14 to negative 48 volts. Contact 2T–1 of the operated 2T relay connects a busy-ground on conductor S and contact 2T–3 removes ground from conductor SA. Calls thereafter may be routed over the latched connections of office IO into appearance AB under control of the common control of office A.

To elaborate, all connections to outgoing trunk circuits are established, as described in Busch, under control of the common control and in response to the translation of dialed digits. Prior to such establishment, each trunk circuit in a trunk group is tested for ascertaining its idle-busy status and therefore its availability for call connections. The status is determined by testing for ground on each of the trunk circuit sleeve conductors which correspond in circuit OT1 to conductors S and SA.

If, for example, a call originates in office A and the common control after a translation of the address code dialed by the originating subscriber directs that the call be routed to office B, a test is made of the sleeve conductors, including conductor SA, of the circuits connected to the direct trunks to the latter office. Assuming circuit OT1 is available and preferred, a connection is established between the calling subscriber and conductors TA, RA, and SA via the network of office A. As previously described, the tip and ring control circuit of circuit OT1 is activated and a seizure signal is forwarded to circuit IT1. This signal is in turn repeated via the latch connection, circuit OTC and trunk O to circuit ITC at office B. A sender of office B is next connected via sender links (not shown) to circuit ITC. After a brief interval, office A outpulses a portion or all of the address code to the office B sender via the latch connection for causing the extension of this connection, for example to station 70.

When augmentation connections are no longer required to serve direct call traffic between offices A and B, they are unlatched. Complementing this latching operation, the outgoing trunk circuit appearance busy-idle indication is altered by busying appearance AB and removing the busy-ground signal from appearance AA. In this manner, the direct call traffic to office B originating in office A is routed solely over the existing direct trunks and the "borrowed" trunk facilities are restored for use in the establishment of call connections between offices A and IO. In particular, center 10 is functionally interconnected with circuit OT1 by the operation of relay 2S1. Next, switch SWA is closed to effect the release of relay EX in circuit OT1 via a path from positive battery, resistor 49, contacts of switch SWA, contact 2S1–1, conductor 26, contact EX–1, diode 12 and the EX relay winding to ground. Current through the above-mentioned path produces an opposing magnetic field reversing the polarity of the EX relay core and it releases. Upon the release of relay 2T its contact 2T–3 connects ground to conductor SA and contact 2T–1 removes ground from lead S.

If, in the above-described example, circuit OT1 is "in use" when relay EX is released, relay 2T is not released and appearance AA busy-ground on conductor S is not removed. The latter ground is to prevent a seizure of circuit OT1 via appearance AA while the circuit is in use and serving an augmentation connection. The relay 2T is held operated upon the release of relay EX by the sleeve supervisory ground. A winding terminal of relay 2T is connected for holding the latter relay over a path which includes diode 13, contact EX–3, contact 2T–4, and contact 2T–5 to the sleeve supervisory circuit. Upon the release of the originating party which is indicated by the tip and ring control circuit, holding ground is removed by the sleeve supervisory circuit for releasing relay 2T. As previously described, contact 2T–1 removes ground from conductor S disconnecting the busy indication from appearance AA and contact 2T–3 connects ground to conductor SA for making appearance AB busy.

Although not disclosed in detail in the present illustrative embodiment, numerous applications of the principles of the disclosed invention are deemed apparent in the light of this teaching such as, for example, controlling the latching control circuit from a local station rather than from a remotely-located management center. Such local control can be advantageously utilized with the remote center which controls the idle-busy status of latched trunk circuits. Further, it is considered apparent in view of this teaching to provide apparatus embodying the principles of this invention in each one of a plurality of switching offices for latching a connection through many offices seriatim. Beyond these particular examples, numerous other arrangements may also be devised by those skilled in the art without departing from the spirit and scope of the invention.

What is claimed is:

1. Augmentation equipment at a communication switching office for latching a switched call interconnection established between two interoffice trunks comprising means in at least one of said trunks responsive to control signals received thereover for holding said interconnections on each call and to effect the release of such connections after each such call, and latching control means responsive to the receipt of coded signals for controlling said holding means to latch said interconnections as augmentation connections which thereafter remain established for subsequent calls.

2. The equipment recited in claim 1 further including means responsive to the receipt of different coded signals for unlatching said interconnections to return control of said interconnections to said holding means responsive to said control signals.

3. Trunk augmentation equipment for providing direct trunks between two communication switching offices comprising in at least one different switching office having incoming trunks and outgoing trunks, connector means operable for establishing call connections between selected respective ones of said incoming and outgoing trunks, common control means responsive to the receipt of call request signals on one of said incoming trunks for operating said connector means to establish a connection between one of said incoming trunks and a prescribed one of said outgoing trunks, and latching circuitry for maintaining the established connection and including a plurality of latch-unlatch means each one being associated with a different one of said incoming trunks, selecting means responsive to coded signals for selecting one of said latch-unlatch means, said one latch-unlatch means being responsive to the selection for controlling the transmission of a latch signal to said incoming trunk associated therewith, and means in said last-mentioned trunk responsive to said latch signal for maintaining the established interconnection as a direct trunk path for subsequent calls.

4. The invention set forth in claim 3 further including a control trunk, said common control means being responsive to the receipt of call request signals on said control trunk for operating said connector means to establish a control connection between said control trunk and said latching circuitry, and wherein said coded signals are transmitted to said selecting means via said control trunk, and said latch-unlatch means is responsive to the receipt of different signals via said selecting means for latching the connection between certain trunks which are identified by said coded signals.

5. The invention set forth in claim 3 wherein each one of said latch-unlatch means includes magnetic latching means operable or releasable by said selecting means, and said selecting means being responsive to said coded signals to latch and unlatch prescribed ones of said relay means respectively for transmitting and removing a latch signal to said incoming trunk associated therewith.

6. The invention claimed in claim 3 wherein said selecting means includes a plurality of interconnectable switching stages and a plurality of output means, each of said output means being connected to a different one of said latch-unlatch means, and each of said switching stages being responsive to said coded signals to interconnect with one another and to one of said output means identified by said coded signals for enabling said last-mentioned means to transmit a ringing signal to control said connected latch-unlatch means.

7. The invention set forth in claim 6 wherein each one of said output means includes a first and second terminal means each of which is identified by a different one of said coded signals, said switching stages being responsive to the receipt of a certain one of said coded signals for connecting to said first terminal means to control the transmission of said latch signal via said latch-unlatch means to said incoming trunk, and said switching stages being responsive to the receipt of a different one of said coded signals for connecting to said second terminal means to control the removal of said latch signal.

8. The invention claimed in claim 6 wherein said latch-unlatch means includes relay means including contact means, and said relay means is operable in response to said ringing signal to activate said contact means which is thereafter effective both for transmitting said latch signal to said incoming trunk as well as for tripping said ringing signal to indicate the latching of said trunk interconnection.

9. Equipment for augmenting a direct trunk group interconnecting two terminal offices comprising at least one trunk extending between each one of said terminal offices and an intermediate office, a plurality of trunk circuits each being connected to an individual one of said trunks at said intermediate office, means at said intermediate office responsive to the receipt of call request signals over one of said trunks connected to one of said terminal offices for establishing an interconnection between said one trunk via the connected trunk circuit with another one of said trunk circuits and a trunk connected to the other one of said terminal offices, means in said interconnected trunk circuits responsive to the receipt of supervisory signals preparatory to latching the established connection for maintaining said trunk circuit interconnection wherein the improvement comprises latching control means at said intermediate office for latching said trunk interconnection including a plurality of latch-unlatch means and a plurality of signal control means each being connected to an individual one of said trunk circuits, switch means responsive to the receipt of coded signals for activating a predetermined one of said latch-unlatch means, and one of said signal control means being responsive to the activation of said one latch-unlatch means for producing a latch signal to latch said interconnection established between said one and another trunk circuit which thereafter remains latched for subsequent calls thereover.

10. The invention set forth in claim 9 wherein said trunk interconnecting one of said terminal offices with said intermediate office is connected to an individual trunk circuit at said one terminal office, said latter circuit having two connectable terminations for connection to functional switching circuits of said one office, said first termination being used routinely for switching calls through said intermediate office, and said second termination being used for serving calls over said latched connections through said intermediate office.

11. The invention claimed in claim 10 further including busy means associated with each one of said terminations for controlling the application of a busy indication thereto to prevent a connection between a busied one of said terminations and said functional switching circuits, and wherein said busy means is controllable subsequent to a latching of said trunk interconnection both for applying said busy indication to said first termination and for removing said busy indication from said second termination.

12. In combination, a first trunk and a second trunk, link means responsive to calling signals for establishing connections between said trunks, a plurality of control means, selecting means responsive to the receipt of control signals via said link means for selecting a prescribed one of said control means, a plurality of latch means selectively activated by coded signals from a selected one of said control means for controlling said link means to latch said established connections between said trunks, and a plurality of unlatch means selectively operative under control of a selected one of said control means for unlatching said latched interconnections.

13. Equipment for augmenting direct trunks interconnecting two terminal switching offices utilizing the trunking facilities interconnecting each one of said offices with at least one common intermediate switching office and latching control circuitry thereat comprising means for establishing a tandem call connection between said terminal offices via switched links of at least one of said intermediate switching offices, means for converting said tandem call connection to an augmentation connection including means for directing said latching control circuitry at said one intermediate office to connect to said switched link and further including means for controlling said circuitry to latch said switched links, and means for routing successive calls originating at one of said terminal offices via said latched trunking facilities to said other terminal office.

14. The invention set forth in claim 13 wherein said latched trunk facilities are connected at said terminal offices to trunk circuits each one of which has two connectable terminations for connection to functional switching circuits, and the routing means further includes means for busying a predetermined one of said terminations and means for removing a busy indication from the other one of said terminations subsequent to latching the facilities.

15. A direct trunk group augmentation system for furnishing additional trunks between a first and second terminal switching office to route excess call traffic therebetween during peak call traffic periods utilizing trunking facilities at an intermediate switching office comprising a plurality of incoming and outgoing trunks each one of which connects to respective incoming and outgoing trunk circuits at said intermediate office and connects to respective trunk circuits at said first and second offices, a traffic management center, selectable access paths interconnecting said center with individual ones of said trunk circuits at said first office, means at said center connected via a selected one of said access paths and a connected one of said trunk circuits for transmitting signals thereover and through said connected incoming trunk to a connected one of said incoming trunk circuits, means at said intermediate office operable for interconnecting said one incoming circuit with a predetermined one of said outgoing trunk circuits, means at said intermediate office responsive to said signals received at said one incoming circuit for operating said interconnecting means to interconnect said one incoming circuit with said one outgoing circuit for establishing a tandem connection, latching control means at said intermediate office being controllable by coded signals for connecting to a designated one of said incoming trunk circuits, said latching control means being thereafter effective to provide a latching signal for maintaining a previously established tandem connection, said transmitting means at said center being connected via a second one of said access paths and a connected second one of said trunk circuits at the terminal office and through a said connected incoming trunk to a second one of said connected incoming circuits for outpulsing coded signals thereover, means responsive to a first portion of said coded signals for operating said interconnecting means to interconnect said second incoming circuit with said latching control menas to establish a control connection, said latching control means including a plurality of latch-unlatch means and selecting means responsive to the receipt of another portion of said coded signals to energize a prescribed one of said latch-unlatch means, said latching means further including a plurality of signal control means one of which is responsive to the energization of the said prescribed one of said latch-unlatch means to provide a latching signal for latching said tandem connection, and busy means at said first office in said one trunk circuit thereat connected to said latched tandem connection controlled by said center, said busy means effective when so controlled to direct excess call traffic over said latched tandem connection thereby furnishing additional trunks for augmenting direct trunks between said first and second offices.

16. Latching circuitry at an intermediate switching office for latching a call interconnection to serve a series of successive calls independently of the need for establishing said interconnection on each successive call and of the need for supervisory signals to maintain said latched interconnection comprising, switching apparatus activatible for establishing said call interconnection between a trunk from a first office to a trunk to a second office, control circuitry operable in response to a call for operating said apparatus to establish said interconnection, said interconnection being maintainablbe by supervisory signals received at said trunks prior to being latched, and said switching apparatus including latching control equipment responsive to the receipt of coded signals for controlling the latching of said maintained interconnection which in a latched state thereafter serves subsequent successive calls.

17. In combination in a switching office having incoming and outgoing circuits, switching apparatus for establishing switched call interconnections between respective ones of said incoming circuits and outgoing circuits, said interconnections being maintainable by supervisory signals received at said respective ones of said incoming and outgoing circuits, latching control equipment responsive to the receipt of coded signals for controlling the latching of said maintained interconnections, and means for switching a series of subsequent calls over individual ones of said latched connections which thereafter are maintained independently of supervisory signals to serve a series of successive calls.

No references cited.

KATHLEEN H. CLAFFY, Primary Examiner

R. P. MYERS, Assistant Examiner